United States Patent [19]
Umezawa

[11] Patent Number: 5,520,233
[45] Date of Patent: May 28, 1996

[54] HEAVY DUTY PNEUMATIC TIRES WITH REDUCED BELT WEIGHT

[75] Inventor: Yujiro Umezawa, Tokyo, Japan

[73] Assignee: Bridgestone Corporation, Tokyo, Japan

[21] Appl. No.: 350,078

[22] Filed: Nov. 29, 1994

[30] Foreign Application Priority Data

Nov. 29, 1993 [JP] Japan .................................. 5-298007
Jan. 11, 1994 [JP] Japan .................................. 6-001242
Nov. 7, 1994 [JP] Japan .................................. 6-272285

[51] Int. Cl.$^6$ .................... B60C 9/18; B60C 9/20; D07B 1/06
[52] U.S. Cl. .................... 152/527; 57/212; 57/902; 152/451; 152/534
[58] Field of Search .................... 152/527, 451, 152/534; 57/902, 212

[56] References Cited

FOREIGN PATENT DOCUMENTS

| | | |
|---|---|---|
| 0143651 | 6/1985 | European Pat. Off. . |
| 0413582 | 2/1991 | European Pat. Off. . |
| 2512747 | 3/1983 | France . |
| 2541504 | 4/1976 | Germany . |
| 60-116504 | 6/1985 | Japan . |
| 3220002 | 9/1991 | Japan . |
| 5186978 | 7/1993 | Japan . |
| 2096950 | 10/1982 | United Kingdom . |
| WO8909305 | 10/1989 | WIPO . |

*Primary Examiner*—Adrienne C. Johnstone
*Attorney, Agent, or Firm*—Sughrue, Mion, Zinn, Macpeak & Seas

[57] ABSTRACT

A heavy duty pneumatic tire comprises a radial carcass, and a belt comprised of at least three belt layers, in which a first belt layer contains cords inclined at a large cord angle with respect to an equatorial plane of the tire and each of a second belt layer and a third belt layer contains cords inclined at a small cord angle with respect to the equatorial plane and cords of the second and third belt layers are crossed with each other. In the tire, the first belt layer is comprised of steel cords having a 1×N structure (N: 2–5) and/or each of the second and third belt layers is comprised of steel cords obtained by twisting 6 sheath steel filaments each having a filament diameter of not more than 0.30 mm around a single core filament at a twisting angle of not more than 6°.

7 Claims, 2 Drawing Sheets

FIG.3a  FIG.3b  FIG.3c  FIG.3d
 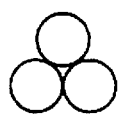 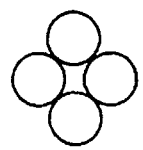 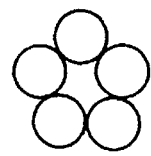
FIG.4a
PRIOR ART
FIG.4b
PRIOR ART
FIG.4c
PRIOR ART
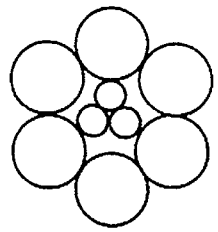 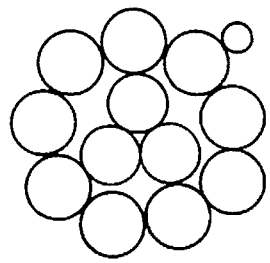 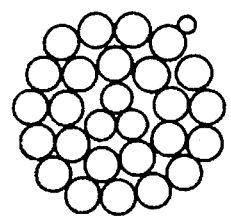

HEAVY DUTY PNEUMATIC TIRES WITH REDUCED BELT WEIGHT

BACKGROUND OF THE INVENTION

1. Field of the Invention

This invention relates to heavy duty pneumatic tires. More particularly it relates to a heavy duty pneumatic radial tire capable of advantageously attaining reduction of belt weight.

2. Description of the Related Art

Recently, it is strongly demanded to improve fuel consumption in an automobile from viewpoints of resource-saving and energy-saving. It is known to reduce tire weight to achieve the improvement of the fuel consumption. As to reducing tire weight, it is effective to reduce the weight of each member constituting the tire. Among the members, the weight reduction of a belt is particularly effective because a ratio of the belt containing rubberized steel cords in the total weight of the tire is large.

The belt reinforcing this type of the tire is comprised of 3-4 belt layers and it is common to have a first belt layer containing cords inclined at a large cord angle with respect to an equatorial plane of the tire and at least two belt layers each arranged outside the first belt layer in a radial direction of the tire and containing cords inclined at a small cord angle with respect to the equatorial plane, in which cords of a second belt layer and a third belt layer are crossed with each other. As the cord constituting each belt layer, there are adopted 3+6 structure, 1×12 structure, 3+9+15+1 structure and the like.

As a countermeasure for reducing the weight of the belt, it is effective to decrease the end count of cords in the belt layer, or to increase the tensile strength of the steel material to decrease the quantity of steel used while maintaining the total tenacity of the belt layer.

In these countermeasures, however, the volume ratio of cords in rubber of the belt layer decreases to lower the tensile rigidity of the belt. As a result, the outer diameter of the tire is largely increased at the time of inflation under an internal pressure or due to creep phenomenon during the use of the tire to bring about the occurrence of separation failure at the belt end or promote uneven wear. Furthermore, the lowering of the tensile rigidity in the belt brings about the decrease of cornering power and the degradation of wear resistance.

SUMMARY OF THE INVENTION

It is, therefore, an object of the invention to provide a belt structure of a heavy duty pneumatic tire causing no lowering of belt rigidity in the circumferential direction even when the total weight of the belt is decreased by reducing the weight of cords in the belt.

According to a first aspect of the invention, there is the provision of a heavy duty pneumatic tire comprising a radial carcass toroidally extending between a pair of bead portions and comprised of at least one carcass ply containing cords therein, and a belt disposed outside the carcass in a radial direction of the tire and comprised of at least three belt layers, in which a first belt layer contains cords inclined at a large cord angle with respect to an equatorial plane of the tire and a second belt layer contains cords inclined at a small cord angle with respect to the equatorial plane and a third belt layer contains cords inclined at a small cord angle in an opposite direction to the inclination direction of the cords in the second belt layer with respect to the equatorial plane, characterized in that the first belt layer is comprised of steel cords having a 1×N structure wherein N is an integer of 2–5.

According to a second aspect of the invention, there is the provision of a heavy duty pneumatic tire comprising a radial carcass toroidally extending between a pair of bead portions and comprised of at least one carcass ply containing cords therein, and a belt disposed outside the carcass in a radial direction of the tire and comprised of at least three belt layers inclusive of a belt layer containing cords inclined at a small cord angle with respect to an equatorial plane of the tire and a belt layer containing cords inclined at a small cord angle in an opposite direction to the inclination direction of the cords in the former belt layer with respect to the equatorial plane, characterized in that in each of the above cross belt layers the cords are steel cords obtained by twisting 6 sheath steel filaments each having a filament diameter of not more than 0.30 mm around a single core filament at a twisting angle of not more than 6°.

According to a third aspect of the invention, there is the provision of a heavy duty pneumatic tire comprising a radial carcass toroidally extending between a pair of bead portions and comprised of at least one carcass ply containing cords therein, and a belt disposed outside the carcass in a radial direction of the tire and comprised of at least three belt layers, in which a first belt layer contains cords inclined at a large cord angle with respect to an equatorial plane of the tire and a second belt layer contains cords inclined at a small cord angle with respect to the equatorial plane and a third belt layer contains cords inclined at a small cord angle in an opposite direction to the inclination direction of the cords in the second belt layer with respect to the equatorial plane, characterized in that the first belt layer is comprised of steel cords having a 1×N structure wherein N is an integer of 2–5 and each of the second and third belt layers is comprised of steel cords obtained by twisting 6 sheath steel filaments each having a filament diameter of not more than 0.30 mm around a single core filament at a twisting angle of not more than 6°.

Moreover, the large and small cord angles inclined with respect to the equatorial plane border on 40° in practice.

BRIEF DESCRIPTION OF THE DRAWINGS

The invention will be described with reference to the accompanying drawings, wherein:

FIGS. 3a–3d are schematically sectional views of various embodiments of the steel cord used in the invention; and FIGS. 4a–4c are schematically sectional views of various embodiments of the conventional steel cord.

DESCRIPTION OF THE PREFERRED EMBODIMENTS

In the first aspect of the invention, the belt is comprised of the first belt layer containing cords inclined at a large cord angle with respect to the equatorial plane of the tire and at least two belt layers each containing cords inclined at a small cord angle with respect to the equatorial plane, in which cords of the second and third belt layers are crossed with each other, as mentioned above. In order to investigate properties of each belt layer required for enhancing the rigidity of the belt in the circumferential direction thereof, various experiments are made to obtain results as mentioned below in detail.

Figure 1:
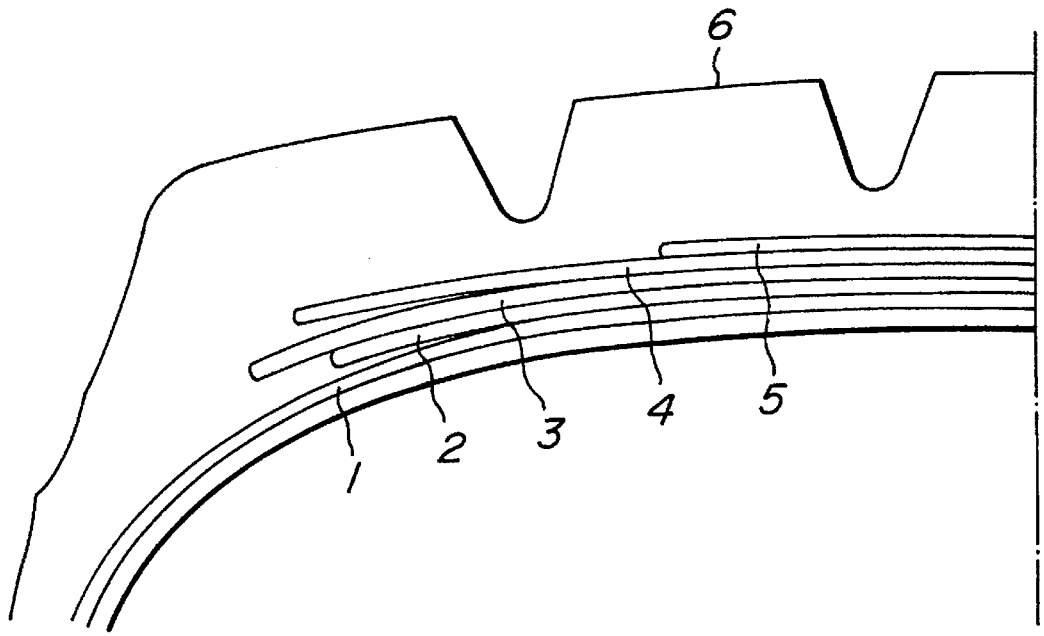
FIG. 1 is a schematically left-half sectional view of an embodiment of the heavy duty pneumatic tire according to the invention.

Moreover, a test tire used in these experiments has substantially the same structure as used in the conventional heavy duty pneumatic tire. As shown in FIG. 1, the tire comprises a radial carcass 1, a belt disposed outside the carcass 1 in the radial direction and comprised of a first belt layer 2, a second belt layer 3, a third belt layer 4 and a fourth belt layer 5, and a tread rubber 6 disposed on the belt. The second belt layer 3 and the third belt layer 4 are cross belt layers each containing cords inclined at the same cord angle with respect to the equatorial plane of the tire, in which the cords of these layers are crossed with each other. The first belt layer 2 located below the cross belt layers contains cords having a cord angle larger than that of the cross belt layers. Moreover, the fourth belt layer 5 may be arranged, if necessary.

At first, the tensile rigidity of the belt is investigated according to the conventional manner when the weight of the belt is decreased by using high-tensioned steel cords in the belt to maintain the total tenacity of the belt. That is, the test tire having a tire size of 11R22.5 is manufactured by applying cords shown in Table 1 to each of the second to fourth belt layers 3–5 shown in FIG. 1 and then the expansion ratio of tire outer diameter (a ratio obtained by averaging values at a central portion and a shoulder portion in the tread) when an internal pressure applied to the test tire is varied from 1.0 kgf/cm$^2$ to 7.0 kgf/cm$^2$ is measured, from which the tensile rigidity of the belt is evaluated as a reciprocal of the measured value. The evaluation results are shown in Table 1. Moreover, the first belt layer 2 is comprised of steel cords having a structure of 3×0.175 mm+ 6×0.30 mm at an end count of 24 cords/50 mm. The cord angle is 50° upward to the right in the first belt layer 2, 20° upward to the right in the second belt layer 3, 20° upward to the left in the third belt layer 4, and 20° upward to the left in the fourth belt layer 5, respectively, and the rubber gauge is the same between cords of the adjacent belt layers.

rubber can be reduced by about 10% as compared with those of the test tire A (conventional example). However, the tensile rigidity of the belt is lowered by about 6.0%.

Now, the inventors have made various examinations on the measure for improving the tensile rigidity of the belt while maintaining a reduction of the belt weight by high tensioning of the steel cord and have found that the tensile rigidity of the belt as a whole can be improved by changing the properties of the first belt layer located at the inside of the tire in the radial direction.

That is, when the belt is stretched in the circumferential direction (e.g. in the inflation under an internal pressure), the cords in the second and third belt layers 3, 4 having a small cord angle are changed into a smaller cord angle to contract the second and third belt layers 3, 4 in a widthwise direction. But the first belt layer 2 having a large cord angle suppresses such a contraction or develops a so-called "propping effect" to play a apart for enhancing the tensile rigidity of the belt as a whole.

In this case, the compression force is applied to the first belt layer in an axial direction of the cord, so that if it is intended to enhance the compression rigidity of the first belt layer in an axial direction of the cord, the propping effect can be increased to further improve the tensile rigidity of the belt as a whole.

In this connection, various tires are manufactured by applying a line of steel cord shown in Table 2 to the first belt layer under the same conditions as in the test tire B used in the aforementioned experiment, and then the tensile rigidity of the belt is measured with respect to the tires to obtain results shown in Table 2. Moreover, the same steel cords (1+6×0.28 mm, end count: 32.8 cords/50 mm, twisting angle: 8.3°) are applied to the second to fourth belt layers, while the cord angles in the belt layers are the same as in the aforementioned experiment. And also, the rubber gauge between cords of adjacent belt layers is constant at 0.65 mm.

TABLE 1

| Test tire | Kind of steel cord(*) Tensile strength | End count (cords/50 mm) | Weight of(*) steel cord | Treat(*) weight | Tensile(**) rigidity of belt |
|---|---|---|---|---|---|
| A | 1 + 6 × 0.34 Tensile strength:100 | 24.9 | 100 | 100 | 100 |
| B | 1 + 6 × 0.28 Tensile strength:112 | 32.8 | 90.6 | 88.9 | 94.0 |

*: Index on the basis that tire A is 100
**: Reciprocal of expansion ratio of tire outer diameter when internal pressure applied to tire is varied from 1.0 kgf/cm$^2$ to 7.0 kgf/cm$^2$.

As seen in Table 1, in the test tire B using the high-tensioned steel cords, not only the weight of steel cord but also tread weight as a total weight of steel cords and coating

TABLE 2

| Tire | Kind of steel cord | End count (cords/50 mm) | Weight of(*) steel cord S | Treat(*) weight T | Tensile(**) rigidity of belt E | E/S | E/T |
|---|---|---|---|---|---|---|---|
| 1 | 3 × 0.175 + 6 × 0.30 | 24.0 | 100 | 100 | 100 | 1.0 | 1.0 |
| 2 | 3 × 0.20 + 6 × 0.36 | 17.2 | 102 | 108 | 101 | 0.99 | 0.94 |
| 3 | 3 + 9 × 0.23 + 1 × 0.15 | 22.5 | 100 | 100 | 98 | 0.98 | 0.98 |
| 4 | 3 + 9 + 15 × 0.175 + 1 × 0.15 | 17.7 | 101 | 104 | 96 | 0.95 | 0.92 |

TABLE 2-continued

| Tire | Kind of steel cord | End count (cords/50 mm) | Weight of(*) steel cord S | Treat(*) weight T | Tensile(**) rigidity of belt E | E/S | E/T |
| --- | --- | --- | --- | --- | --- | --- | --- |
| 5 | 1 × 5 × 0.23 | 55.1 | 97 | 86 | 110 | 1.13 | 1.28 |
| 6 | 1 × 3 × 0.30 | 55.1 | 98 | 88 | 112 | 1.14 | 1.27 |
| 7 | 1 × 2 × 0.38 | 49.8 | 95 | 92 | 114 | 1.20 | 1.24 |

*: Index on the basis that tire 1 is 100
**: Reciprocal of expansion ratio of tire outer diameter when internal pressure applied to tire is varied from 1.0 kgf/cm$^2$ to 7.0 kgf/cm$^2$.

As seen from Table 2, when a single twisted steel cord of 1×N structure is applied to the first belt layer, the size growth of the tire is suppressed as compared with the case of using the conventional two to three layer twisted steel cords and hence the tensile rigidity of the belt is improved. Moreover, the size growth of the tire using the single twisted steel cord becomes smaller than that of the test tire A in Table 1. Therefore, it is possible to improve the tensile rigidity of the belt by applying the single twisted steel cord to the first belt layer without obstructing the weight reduction of the belt and hence the tire.

Naturally, the compression rigidity of the first belt layer becomes high as the end count of the cords increases or the weight of steel cords becomes large, so that it is clear that the degree of contribution of the steel cord in the first belt layer to the belt rigidity is evaluated by indicating the degree of the tire size growth per unit weight of steel cord (E/S in Table 2). According to this indication, the single twisted steel cord has a considerably large degree of contribution as compared with the layer twisted steel cord.

On the other hand, the effect of reducing the tire weight is clarified by indicating the degree of the tire size growth per unit weight of tread (E/T in Table 2). This indication also shows that the single twisted steel cord has a considerably large contribution degree as compared with the layer twisted steel cord.

As seen from the above experimental results, according to the first aspect of the invention, the belt structure avoiding the degradation of tensile rigidity in the belt due to the reduction of tire weight can be realized by applying the single twisted steel cords of 1×N structure to the first belt layer disposed beneath the cross belt layers. Moreover, the reason why the number of steel filaments in the single twisted steel cord is limited to 5 at maximum is due to the fact that when the number of steel filaments is 6 or more, the ratio of rubber or space occupied in the section of the steel cord becomes high to make the weight reduction unfavorable.

According to the second aspect of the invention, there are made various studies with respect to the steel cord used in the second and third belt layers 3, 4 as cross belt layers and the fourth belt layer 5 for clarification of properties contributing to the improvement of belt rigidity in the circumferential direction of the belt.

As previously mentioned, it is effective to reduce the weight of the steel cord for the weight reduction of the belt. Here, the steel cord of 1+6 structure is formed by twisting 6 sheath steel filaments around a single core steel filament and is advantageous in the weight reduction because the number of steel filaments is less and the decrease of the cord tenacity is small as compared with steel cords of 3+6, 3+9+1, 3+9+15+1 and 1×12 structures generally used as a cord in the belt. Furthermore, the steel cord of 1+6 structure is advantageous in the cost because the twisted cord can be produced at one step.

In case of using the steel cord of 1+6 structure, the belt weight can be reduced while maintaining the total tenacity of the belt by high tensioning of the cord, but the degradation of belt rigidity in the circumferential direction is caused as previously mentioned.

In order to supplement the degradation of tensile rigidity in the belt, it is basically effective to increase the modulus of elasticity against the tension in the cord. In the conventional steel cord used in the belt, the steel filaments are twisted at a twisting angle of about 8°–10° with respect to the axis of the cord. If the twisting angle is made small, the modulus of elasticity in the cord increases to enhance the rigidity of the belt in the circumferential direction.

However, as the twisting angle in the steel cord becomes small, the flexibility of the cord realized by spirally twisting the steel filaments is damaged to degrade the durability against cord breakage when the cord is repeatedly subjected to bending deformation, which brings about the degradation of tire life. Particularly, when the shoulder portion of the tire is continuously subjected to input from projections existing on road surface at a state that the water content in the coating rubber for the belt rises up to about 1 wt % in a long-term use of the tire, excessive input is applied to the steel filaments in the cord under corrosion environment, so that the breakage of the sheath steel filaments in the steel cord is apt to be caused in the belt layer located outward in the radial direction of the tire among the two cross belt layers, which results in the cord breakage.

Therefore, when the steel cord of 1+6 structure is applied to the cross belt layers, it is necessary to adequately control the filament diameter and the twisting angle of the sheath steel filament in the steel cord as seen from the following experiment.

In this experiment, various tires having a tire size of 11R22.5 are manufactured by applying steel cords shown in Table 3 to the second to fourth belt layers 3–5 and applying the conventional steel cord of 3×1.75 mm+6×0.30 mm to the first belt layer 2, and then the expansion ratio of tire outer diameter when the internal pressure applied to the tire is changed from 1.0 kgf/cm$^2$ to 7.0 kgf/cm$^2$ is measured in the same manner as in the aforementioned experiments, from which the tensile rigidity of the belt is evaluated as a reciprocal of the measured value.

Furthermore, the tire subjected to an internal pressure of 7.0 kgf/cm$^2$ after 300 cc of water is filled in the tire is run on a drum at a speed of 60 km/h under a load of 2500 kg over a distance of 10,000 km and then the internal pressure is decreased to 5.0 kgf/cm$^2$ and thereafter run on a drum provided with projections (radius of curvature at top: 15 mm) at an interval of 100 mm in the circumferential direction of the drum at a speed of 60 km/h under a load of 2500 kg over a distance of 10,000 km so as to hit the projection on the shoulder portion of the tire (located at a position of 50 mm separated apart from a widthwise center of the tread).

Next, the tire is cut to measure the number of filament breaking positions in the cord for the belt over its full periphery, which is an indication for evaluating the resistance to cord breakage.

These evaluation and measured results are also shown in Table 3. The various weights and expansion ratio of tire outer diameter in Table 3 are indicated by an index on the basis that the tire A is 100. Moreover, the cord angle is 52° upward to the right in the first belt layer 2, 20° upward to the right in the second belt layer 3, 20° upward to the left in the third belt layer 4, and 20° upward to the left in the fourth belt layer 5, respectively, and the rubber gauge is the same between cords of the adjacent belt layers.

cord is raised to improve the tensile rigidity of the belt, which is remarkably superior to the result of the tire A before the weight reduction. This effect is obtained at a small twisting angle of not more than 6°. Moreover, the lower limit of the twisting angle is preferable to be 3° in the form causing no disentangling of the cord in view of the cord production.

As a result of the drum test, however, there is retained a problem in the fatigue resistance of the cord itself because the frequency of causing the cord breakage is higher than those in the tires A and B. Especially, the cord breakage in the tires C and D using cords of a smaller twisting angle is caused in the third belt layer among the belt layers located

TABLE 3

| Tire | Kind of steel cord | End count (cords/50 mm) | Twisting angle $\alpha$ (°) | Weight of(*) steel cord | Tread(*) weight T | Tensile(**) rigidity of belt E | E/T | Number of filament breaking positions |
|---|---|---|---|---|---|---|---|---|
| A | 1 + 6 × 0.34 | 24.9 | 8.7 | 100 | 100 | 100 | 1.0 | 2 |
| B | 1 + 6 × 0.34 | 22.4 | 8.7 | 90 | 95 | 94 | 0.99 | 3 |
| C | 1 + 6 × 0.34 | 22.4 | 5.6 | 89 | 94 | 102 | 1.09 | 39 |
| D | 1 + 6 × 0.34 | 22.4 | 3.8 | 89 | 94 | 103 | 1.10 | 76 |
| E | 1 + 6 × 0.32 | 25.5 | 5.7 | 90 | 93 | 103 | 1.11 | 8 |
| F | 1 + 6 × 0.32 | 25.5 | 3.6 | 91 | 93 | 104 | 1.12 | 18 |
| G | 1 + 6 × 0.30 | 28.9 | 8.9 | 90 | 92 | 94 | 1.02 | 0 |
| H | 1 + 6 × 0.30 | 28.9 | 5.4 | 90 | 91 | 103 | 1.13 | 0 |
| I | 1 + 6 × 0.30 | 28.9 | 3.4 | 90 | 91 | 104 | 1.14 | 0 |
| J | 1 + 6 × 0.28 | 33.1 | 8.3 | 90 | 89 | 95 | 1.07 | 0 |
| K | 1 + 6 × 0.28 | 33.1 | 5.0 | 90 | 89 | 103 | 1.16 | 0 |
| L | 1 + 6 × 0.25 | 41.8 | 8.9 | 91 | 88 | 95 | 1.08 | 0 |
| M | 1 + 6 × 0.25 | 41.8 | 5.6 | 90 | 87 | 103 | 1.18 | 0 |
| N | 1 + 6 × 0.25 | 41.8 | 3.2 | 90 | 87 | 105 | 1.21 | 0 |

*: Index on the basis that tire A is 100
**: Reciprocal of expansion ratio of tire outer diameter when internal pressure applied to tire is varied from 1.0 kgf/cm$^2$ to 7.0 kgf/cm$^2$.

As seen from Table 3, the tensile strength of the steel filament in the steel cord of the tire B is increased by 10% as compared with the tire A, so that the quantity of steel cords used is reduced while maintaining the total tenacity of the belt. Therefore, the tire B can attain the weight reduction of about 10% as compared with the tire A, but the tensile rigidity of the belt is decreased by about 6.0%. Moreover, the effect of tire weight reduction is advantageous to adopt the degree of the tire size growth per unit weight of tread (E/T in Table 3) as an indication.

Now, the inventors have made various studies with respect to the measure for improving the tensile rigidity of the belt while maintaining the weight reduction of the belt by high-tensioning of the steel cord and found that the tensile rigidity of the belt as a whole can be improved by changing the twisting angle of the steel filament in the steel cord. Since the twisting angle in the cord used in the tires A and B is generally 8.7°, the tensile rigidity is attempted by changing the twisting angle in the invention.

Figure 2A:
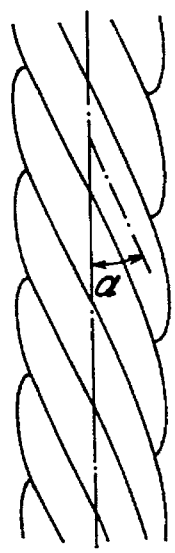
FIGS. 2a and 2b are diagrammatic views illustrating a twisting angle of a cord having a 1+6 structure.
Figure 2B:
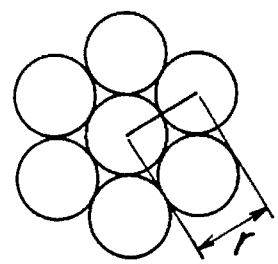

The twisting angle in the steel cord is an inclination of the sheath steel filament with respect to the axis of the cord as shown by an angle $\alpha$ in FIG. 2a. Concretely, when a spiral radius of the sheath steel filament in the cord is r as shown in FIG. 2b and a twisting pitch of the sheath steel filament is Ps, the twisting angle $\alpha$ can be represented by the following equation:

$\alpha = \tan^{-1}(2\pi r/Ps)$

In the tires C and D, the twisting angle is reduced by lengthening the twisting pitch of the sheath steel filament in the cord of the tire B, whereby the tensile modulus of the inside the neutral axis of bending deformation in the presence of the input from the projection (outside viewing from the radial direction of the tire) and further caused in the sheath steel filaments of the cord located inside the bending deformation of the cord (outside viewing from the radial direction of the tire). Moreover, locally plastic bending deformation is distinctively caused in the vicinity of the broken portion of the cord.

Assuming from the above fact, it is considered that when the input from the projection is applied to the tire, the force in the compression direction of the cord is applied to the belt and further when the bending deformation is caused in the belt, the movement of the sheath steel filament from inside of the bending toward outside thereof along the spiral shape is restricted in the steel cord of the small twisting angle to cause the buckling in the steel filaments located inside the bending at the bending deformation of the cord. Hence a large bending deformation is locally caused to frequently cause the breakage of the steel filaments.

The same evaluation as mentioned above is conducted with respect to tires E–N using steel cords having the same tensile strength as in the cords of the tires C and D by variously changing the twisting angle and filament diameter of the sheath steel filament. Moreover, the end count of the steel cords in the belt layer is changed to have the same total tenacity of the belt in all of the tires E–N, and also the coating rubber gauge among the second to fourth belt layers is the same in all tires.

As seen from Table 3, even in the cords having a twisting angle of 3°–6°, the number of cord breaking positions is decreased by reducing the diameter of the sheath steel filament. Particularly, when the filament diameter is not more than 0.30 mm, there is caused no cord breakage. Thus, the resistance to cord breakage can advantageously be obtained as compared with the tire A as a standard.

That is, the strain based on local bending in the sheath steel filament located inside the bending of the cord in the presence of the input from the projection can be mitigated by reducing the filament diameter even when the twisting angle in the cord is small, whereby the resistance to cord breakage is largely improved. In other words, the rigidity per tread unit weight in the belt reinforced with the steel cords according to the second aspect of the invention becomes high without damaging the resistance to cord breakage.

As seen from the above experimental results, the improvement of the rigidity in the circumferential direction of the belt is attained when either one of the first belt layer and the cross belt layers takes the aforementioned adequate structure. Of course, the rigidity in the circumferential direction of the belt is further enhanced when both of the the first belt layer and the cross belt layers take the aforementioned adequate structures.

That is, tires having the same tire size as mentioned above are manufactured by applying the steel cord of 1×N structure (N: 2–5) to the first belt layer and applying the steel cords, which are obtained by twisting six sheath steel filaments having a filament diameter of not more than 0.30 mm around a single core steel filament at a twisting angle of not more than 6°, to the second to fourth belt layers under the same conditions as in the aforementioned experiments and then the expansion ratio of tire outer diameter is measured, from which the tensile rigidity of the belt is evaluated as a reciprocal of the measured value. Furthermore, the number of filament breaking positions in the cord over the full periphery of the belt is measured by cutting the tire after running under the same conditions as in the experiment of Table 3 to evaluate the resistance to cord breakage.

When all of the belt layers in the belt are rationalized as mentioned above, the tensile rigidity of the belt is raised to 1.08–1.12 times of the case of rationalizing only the first belt layer or to 1.10–1.16 times of the case of rationalizing only the second to fourth belt layers.

On the other hand, when the twisting angle in the steel cord of 1+6 structure constituting each of the second to fourth belt layers is not more than 6°, there is caused a problem in the resistance to cord breakage, but this problem is solved by restricting the diameter of the sheath steel filament to not more than 0.30 mm as previously mentioned. In the tire comprising the belt obtained by rationalizing all belt layers according to the tire aspect of the invention, therefore, it is expected to improve the resistance to cord breakage to substantially the same level as in the case of rationalizing only the second to fourth belt layers. Actually, the number of broken cords is reduced to 40% or more as compared with the case of rationalizing only the second to fourth belt layers, so that the considerably excellent and unexpected resistance to cord breakage is obtained as compared with the case of rationalizing only the second to fourth belt layers. That is, the resistance to cord breakage in the second to fourth belt layers are newly found to be further improved by applying the steel cord of 1×N structure to the first belt layer.

Moreover, the improvement of the resistance to cord breakage by the rationalization of the first belt layer is considered based on the following reason.

The belt attached onto the carcass ply in the green tire at the building step is expanded at subsequent vulcanization step. In this case, the compression force is applied to the first belt layer having a large cord angle with respect to the equatorial plane likewise the case of inflating the tire product under an internal pressure. As a result, the shape of the steel cord in the first belt layer is changed from the original state in the green tire into a shape of enlarging the spiral diameter of sheath steel filament to open the twisted state. Such a shape change is conspicuous in the single twisted cord of 1×N structure as compared with two layer twisted cord of 3+6 or 3+9 structure. Furthermore, as the twisted state is opened, the initial elongation region at the stretching of the cord increases.

On the other hand, when the input from the projections on road surface is applied to the tire, the first belt layer is deformed by a tensile force opposite to the case of inflating under the internal pressure. Furthermore, the bending deformation of the belt located on the projection is constant. Therefore, when the initial elongation of the cord in the first belt layer is large as mentioned above, the bending neutral axis in the bending deformation of the belt shifts toward the outside in the radial direction of the tire to reduce the compression input to the cross belt layers located above the first belt layer and hence the locally bending strain of the sheath steel filament inducing the filament breakage is reduced.

The following examples are given in illustration of the invention and are not intended as limitations thereof.

EXAMPLE 1

In the tire belt structure shown in FIG. 1, steel cords of 1+6×0.28 mm made from a high carbon steel having a carbon content of 0.82 wt % (twisting angle: 8.3°) are used at an end count of 32.8 cords/50 mm in each of the second belt layer 3 (cord angle: 20° upward to the right), third belt layer 4 (cord angle: 20° upward to the left) and fourth belt layer 5 (cord angle: 20° upward to the left), while steel cords (C: 0.82 wt %) having a twisting structure as shown in FIGS. 3a–3d and 4a–4c are applied to the first belt layer 2 (cord angle: 65° upward to the right), whereby various tires for truck and bus having a tire size of 11R22.5 are manufactured. The tread is illustrated as element 6.

In the thus obtained tires, the tensile rigidity of the belt as a reciprocal of expansion ratio of tire outer diameter (average of values in central portion and shoulder portion of the tread) when the internal pressure is changed from 1.0 kgf/cm$^2$ to 7.0 kgf/cm$^2$, the quantity of steel cords used constituting the belt of each tire (weight of steel cord) and tread weight in each tire before the production of the tire are measured to obtain results as shown in Table 4 together with the specification of each of the steel cords used.

As seen from Table 4, in the tires according to the first aspect of the invention, the improvement of tensile rigidity of the belt is attained with the reduction of tire weight.

TABLE 4

| Tire | Kind of steel cord | End count (cords/50 mm) | Weight of(*) steel cord S | Tread(*) weight T | Tensile(**) rigidity of belt E | E/S | E/T | Remarks |
|---|---|---|---|---|---|---|---|---|
| 1-1 | 3 × 0.175 + 6 × 0.30 | 24.0 | 100 | 100 | 100 | 1.0 | 1.0 | Comparative |
| 1-2 | 3 + 9 × 0.23 + 1 × 0.15 | 22.5 | 100 | 100 | 97 | 0.97 | 0.97 | Example |
| 1-3 | 3 + 9 + 15 × 0.175 + 1 × 0.15 | 17.7 | 101 | 104 | 95 | 0.94 | 0.91 | |
| 1-4 | 1 × 2 × 0.38 | 49.8 | 95 | 92 | 113 | 1.19 | 1.23 | First |
| 1-5 | 1 × 3 × 0.30 | 55.1 | 98 | 88 | 115 | 1.17 | 1.31 | invention |
| 1-6 | 1 × 4 × 0.26 | 55.1 | 99 | 87 | 116 | 1.17 | 1.33 | example |
| 1-7 | 1 × 5 × 0.23 | 55.1 | 97 | 86 | 112 | 1.15 | 1.30 | |

*: Index on the basis that tire 1-1 is 100
**: Reciprocal of expansion ratio of tire outer diameter when internal pressure applied to tire is varied from 1.0 kgf/cm$^2$ to 7.0 kgf/cm$^2$.

EXAMPLE 2

Various tires for truck and bus having a belt structure shown in FIG. 1 and a tire size of 11R22.5 are manufactured by using steel cords of 3×0.175 mm+ 6×0.30 mm structure at an end count of 24.0 cords/50 mm in the first belt layer 2 and applying the steel cords made from high carbon steel (C: 0.82 wt %) and having a structure as shown in FIG. 2 to the remaining second belt layer 3 (cord angle: 20° upward to the right), third belt layer 4 (cord angle: 20° upward to the left) and fourth belt layer 5 (cord angle: 20° upward to the left) according to the specification shown in Table 5.

In tires obtained, the same evaluation on the resistance to cord breakage as described in Table 3 is conducted and also the tensile rigidity of the belt as a reciprocal of expansion ratio of tire outer diameter (average of values in central portion and shoulder portion of the tread) when the internal pressure is changed from 1.0 kgf/cm$^2$ to 7.0 kgf/cm$^2$, and tread weight in each tire before the production of the tire are measured to obtain results as shown in Table 5.

As seen from Table 5, in the tires according to the second aspect of the invention, the improvement of tensile rigidity of the belt is attained with the reduction of tire weight and also the occurrence of cord breakage can be avoided.

In the tires obtained, the tensile rigidity of the belt as a reciprocal of expansion ratio of tire outer diameter (average of values in central portion and shoulder portion of the tread) when the internal pressure is changed from 1.0 kgf/cm$^2$ to 7.0 kgf/cm$^2$, the quantity of steel cords used constituting the belt of each tire (weight of steel cord) and treat weight in each tire before the production of the tire are measured.

Furthermore, the tire subjected to an internal pressure of 7.0 kgf/cm$^2$ after 300 cc of water is filled in the tire is run on a drum at a speed of 60 km/h under a load of 2500 kg over a distance of 30,000 km and then the internal pressure is decreased to 5.0 kgf/cm$^2$ and thereafter run on a drum provided with projections (radius of curvature at top: 15 mm) at an interval of 100 mm in the circumferential direction of the drum at a speed of 60 km/h under a load of 2500 kg over a distance of 10,000 km so as to hit the projection on the shoulder portion of the tire (located at a position of 50 mm separated apart from a widthwise center of the tread). Next, the tire is cut to measure the number of filament breaking positions in the cord for the belt over its full periphery. Moreover, the evaluation on the resistance to cord breakage is carried out under severer conditions as compared with the evaluation on the resistance to cord breakage conducted in Table 3.

TABLE 5

| Tire | Kind of steel cord | End count (cords/50 mm) | Twisting angle α (°) | Weight of(*) steel cord | Tread(*) weight T | Tensile(**) rigidity of belt E | E/T | Number of filament breaking positions | Remarks |
|---|---|---|---|---|---|---|---|---|---|
| 2-1 | 1 + 6 × 0.34 | 24.9 | 8.7 | 100 | 100 | 100 | 1.0 | 2 | Comparative Example |
| 2-2 | 1 + 6 × 0.28(***) | 33.1 | 5.4 | 90 | 90 | 102 | 1.13 | 0 | Second invention example |
| 2-3 | 1 × 0.32 + 6 × 0.28 | 31.9 | 5.4 | 90 | 90 | 103 | 1.14 | 0 | Second invention example |

*: Index on the basis that tire 2-1 is 100
**: Reciprocal of expansion ratio of tire outer diameter when internal pressure applied to tire is varied from 1.0 kgf/cm$^2$ to 7.0 kgf/cm$^2$.
***: Use of wavy-formed core filament (wave length: 5.0 mm, wave height: 0.16 mm)

EXAMPLE 3

Various tires for truck and bus having a belt structure shown in FIG. 1 and a tire size of 11R22.5 are manufactured by applying steel cords made from high carbon steel (C: 0.82 wt %) and having various structures to the first belt layer 2 (cord angle: 52° upward to the right), second belt layer 3 (cord angle: 20° upward to the right), third belt layer 4 (cord angle: 20° upward to the left) and fourth belt layer 5 (cord angle: 20° upward to the left) according to the specification shown in Table 6.

The evaluation results are also shown in Table 6, from which it is clear that in the tires according to the third aspect of the invention, further improvement of tensile rigidity of the belt is attained with the reduction of tire weight and also the occurrence of cord breakage can be avoided.

TABLE 6

| Tire | First belt layer Kind of Steel cord | First belt layer End count (cords/ 50 mm) | Second to fourth belt layers Kind of Steel cord | Second to fourth belt layers Twisting angle α (°) | Second to fourth belt layers End count (cords/ 50 mm) |
| --- | --- | --- | --- | --- | --- |
| 3-1 | 3 × 0.175 + 6 × 0.30 | 24.0 | 1 + 6 × 0.34 | 8.7 | 22.4 |
| 3-2 | 1 × 3 × 0.30 | 55.1 | 1 + 6 × 0.34 | 8.7 | 22.4 |
| 3-3 | 3 × 0.175 + 6 × 0.30 | 24.0 | 1 + 6 × 0.34 | 5.6 | 22.4 |
| 3-4 | 3 × 0.175 + 6 × 0.30 | 24.0 | 1 + 6 × 0.28 | 5.0 | 33.1 |
| 3-5 | 1 × 3 × 0.30 | 55.1 | 1 + 6 × 0.28 | 5.0 | 33.1 |
| 3-6 | 1 × 5 × 0.23 | 55.1 | 1 + 6 × 0.28(***) | 3.8 | 33.1 |
| 3-7 | 1 × 2 × 0.38 | 49.8 | 1 × 0.32 + 6 × 0.28 | 5.4 | 33.1 |
| 3-8 | 1 × 4 × 0.26 | 55.1 | 1 + 6 × 0.25 | 5.6 | 41.8 |
| 3-9 | 1 × 5 × 0.23 | 32.0 | 1 + 6 × 0.28(***) | 5.4 | 33.1 |
| 3-10 | 1 × 3 × 0.30 | 32.0 | 1 + 6 × 0.28 | 5.0 | 33.1 |

| Tire | Weight(*) of steel cord S | Tread(*) weight T | Tensile(**) rigidity of belt E | E/S | E/T | Number of filament breaking positions | Remarks |
| --- | --- | --- | --- | --- | --- | --- | --- |
| 3-1 | 100 | 100 | 100 | 100 | 100 | 21 | Comparative Example |
| 3-2 | 99 | 97 | 113 | 114 | 117 | 12 | First invention example |
| 3-3 | 100 | 100 | 109 | 109 | 109 | 126 | Comparative Example |
| 3-4 | 100 | 96 | 110 | 110 | 114 | 15 | Second invention example |
| 3-5 | 99 | 93 | 122 | 124 | 132 | 6 | Third invention example |
| 3-6 | 99 | 93 | 125 | 126 | 133 | 9 | |
| 3-7 | 98 | 95 | 119 | 121 | 126 | 3 | |
| 3-8 | 100 | 91 | 120 | 121 | 133 | 0 | |
| 3-9 | 88 | 89 | 107 | 123 | 121 | 0 | |
| 3-10 | 88 | 87 | 109 | 124 | 124 | 0 | |

*: Index on the basis that tire 3-1 is 100.
**: Reciprocal of expansion ratio of tire outer diameter when internal pressure applied to tire is varied from 1.0 kgf/cm² to 7.0 kg/cm².
***: Use of wavy-formed core filament (Wave length: 5.0 mm, wave height: 0.16 mm)

According to the invention, the tensile rigidity of the belt can be improved in the tires having the reduced belt weight, so that the reduction of tire weight can be realized without sacrificing the tire performances.

What is claimed is:

1. A heavy duty pneumatic tire comprising a radial carcass toroidally extending between a pair of bead portions and comprised of at least one carcass ply containing cords therein, and a belt disposed outside the carcass in a radial direction of the tire and comprised of at least three belt layers inclusive of a belt layer containing cords inclined at a small cord angle with respect to an equatorial plane of the tire and a belt layer containing cords inclined at a small cord angle in an opposite direction to the inclination direction of the cords in the former belt layer with respect to the equatorial plane, characterized in that in each of the above cross belt layers the cords are steel cords obtained by twisting 6 sheath steel filaments each having a filament diameter of not more than 0.30 mm around a single core filament at a twisting angle of not more than 6°.

2. The heavy duty pneumatic tire according to claim 1, wherein said at least three belt layers consist of four belt layers, the three radially outer of said four belt layers consisting of said cross belt layers and a radially outermost belt layer containing cords inclined at a small cord angle with respect to the equatorial plane, said small cord angle in said cross belt layers and said radially outermost belt layer being 20°.

3. The heavy duty pneumatic tire according to claim 1, wherein said steel cords have a 1+6×0.28 mm structure.

4. The heavy duty pneumatic tire according to claim 1, wherein said steel cords have a 1×0.32 mm+6×0.28 mm structure.

5. The heavy duty pneumatic tire according to claim 1, wherein said twisting angle is 5.4°.

6. The heavy duty pneumatic tire according to claim 1, wherein said filaments in said steel cords are made from a high carbon steel having a carbon content of 0.82 wt %.

7. A heavy duty pneumatic tire according to claim 1, wherein said at least three belt layers also include a radially innermost belt layer containing cords inclined at a large cord angle with respect to the equatorial plane, the cords in said radially innermost belt layer being steel cords having a 1×N structure, N being an integer in the range of from 2 to 5.

* * * * *